(12) United States Patent
Byoun

(10) Patent No.: US 6,559,907 B1
(45) Date of Patent: May 6, 2003

(54) CHASSIS FIXING APPARATUS FOR LCD MONITOR WITH PRESSED AND ENTRAPPED HOOKS

(75) Inventor: Dae-Hyoun Byoun, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/561,927

(22) Filed: May 1, 2000

(30) Foreign Application Priority Data

May 26, 1999 (KR) .............................................. 99-9111

(51) Int. Cl.[7] .......................................... G02F 1/1333
(52) U.S. Cl. ....................................................... 349/58
(58) Field of Search .............................. 349/58; 348/794

(56) References Cited

U.S. PATENT DOCUMENTS

| | | | |
|---|---|---|---|
| 5,666,172 A | | 9/1997 | Ida et al. ........................ 349/58 |
| 5,680,183 A | | 10/1997 | Sasuga et al. ................. 349/58 |
| 5,835,139 A | | 11/1998 | Yun et al. ...................... 349/58 |
| 5,844,774 A | | 12/1998 | Gushiken et al. ............ 361/681 |
| 5,905,550 A | * | 5/1999 | Ohgami et al. ................ 349/58 |
| 5,995,179 A | | 11/1999 | Tamura et al. ................. 349/58 |
| 6,040,811 A | | 3/2000 | Malhi ............................ 345/87 |
| 6,064,453 A | * | 5/2000 | Inubushi et al. ............... 349/58 |
| 6,296,493 B1 | * | 10/2001 | Michiya ....................... 439/66 |
| 6,356,321 B1 | * | 3/2002 | Ogawa ........................ 349/149 |
| 6,388,722 B1 | * | 5/2002 | Yoshii et al. .................. 349/58 |

* cited by examiner

*Primary Examiner*—Robert H. Kim
*Assistant Examiner*—Timothy L Rude
(74) *Attorney, Agent, or Firm*—Robert E. Bushnell, Esq.

(57) ABSTRACT

The chassis fixing apparatus for a liquid crystal display (LCD) monitor is disclosed. The chassis fixing apparatus according to the present invention includes a chassis for engaging the liquid crystal panel, and a hook integrally formed in an interior of the front casing and receiving the chassis therein for supporting the chassis. When engaging a rear casing to the front casing, the hook is pressed to the chassis for preventing the chassis from escaping from the hook. The hook is formed at a certain distance from an inner surface of the front casing for enhancing an engaging force of the chassis based on an increased force for pressing the hook when engaging the rear casing to the front casing, so that an external appearance of the monitor is enhanced by decreasing the width of an edge of the front casing which surrounds an edge of the LCD panel, and as the chassis which fixedly supports the LCD panel to the front casing based on a snap structure, it is possible to significantly enhance the assembly and disassembly.

20 Claims, 3 Drawing Sheets

CHASSIS FIXING APPARATUS FOR LCD MONITOR WITH PRESSED AND ENTRAPPED HOOKS

CLAIM OF PRIORITY

This application makes reference to, incorporates the same herein, and claims all benefits accruing under 35 U.S.C. §119 from an application entitled Chassis Fixing Device of LCD Monitor earlier filed in the Korean Industrial Property Office on May 26, 1999, and there duly assigned Ser. No. 99-9111 by that Office.

BACKGROUND OF THE INVENTION

1. Field of the Invention

The present invention relates to a chassis fixing apparatus for an LCD (Liquid Crystal Display) monitor, and in particular to a chassis fixing apparatus for an LCD monitor that makes it possible to decrease a border width of a front casing that supports an edge portion of an LCD panel.

2. Description of the Background Art

An LCD monitor is a light receiving type display apparatus capable of changing an optical characteristic such as a double refraction, rotatory polarization, two color effects, light scattering characteristic, etc. of a liquid crystal cell based on a change of a molecular arrangement by applying a voltage to a liquid crystal. The LCD monitor has advantages in that the monitor has a small size and it is portable, so that the LCD monitor is widely used for an output apparatus such as a television, computer, video camera, etc.

A liquid crystal display panel having the liquid crystal cells is capable of visually representing data. The liquid crystal display panel is encased in the monitor housing allowing for protection of the display panel and other electronic components of the monitor. The housing also helps a user to view the video images displayed on the panel at specific viewing angles. To allow for a stable mounting of the monitor, many parts may be necessary for housing the liquid crystal display. The small appearance of the LCD monitor is compromised by the excessive mounting and connecting parts. Furthermore, the excess parts adds to manufacturing time and cost. A bulky housing may also ruin external appearance of the monitor.

An exemplar of the background art, Ida et al. (U.S. Pat. No. 5,666,172, Flat Panel Display Device, Sep. 9, 1997) discloses a case for a liquid crystal display device. Yun et al. (U.S. Pat. No. 5,835,139, Computer Having Liquid Crystal Display Between Frames Attached at the Edges, Nov. 10, 1998), Gushiken et al. (U.S. Pat. No. 5,844,774, Portable Apparatus with Housing for Containing Functional Elements and with Bracket for Supporting the Housing, Dec. 1, 1998), Tamura et al. (U.S. Pat. No. 5,995,179, Liquid Crystal Display Module, Nov. 30, 1999), and Malhi (U.S. Pat. No. 6,040,811, Thin Display Unit for Portable Computers, Mar. 21, 2000) show an assembly of a liquid crystal display device using multiple fasteners such as screws. Sasuga et al. (U.S. Pat. No. 5,680,183, Structure of Liquid Crystal Display Device for Easy Assembly and Disassembly, Oct. 21,1997) discloses a liquid crystal display case using fixing pawls and hooks for assembly.

SUMMARY OF THE INVENTION

Accordingly, it is an object of the present invention to provide a chassis fixing apparatus for an LCD monitor which has a good external appearance of a monitor by decreasing the width of an edge portion of a front casing which surrounds and supports an edge portion of an LCD panel and significantly enhances manufacturing productivity by fixing a chassis that supports the LCD panel to a front casing based on a snap structure.

It is another object to provide a stable mounting for an LCD panel to the monitor case.

It is yet another object to provide an LCD mounting structure that has quick and easy assembly and disassembly.

It is still a further object to reduce the failure rate of the monitor by having a mounting structure of an LCD panel that has a minimal amount of parts.

In order to achieve the above objects, there is provided a chassis fixing apparatus for an LCD monitor according to the present invention which includes a front casing for surrounding and supporting an edge portion of a liquid crystal panel, a chassis for engaging the liquid crystal panel, and a hook portion integrally formed in an interior of the front casing and receiving the chassis therein for supporting the chassis. When engaging a rear casing to the front casing, the hook portion is pressed to the chassis for preventing the chassis from escaping from the hook portion.

In the present invention, the hook portion is formed at a certain distance from an inner surface of the front casing for enhancing an engaging force of the chassis based on an increased force for pressing the hook portion when engaging the rear casing to the front casing.

The external appearance of a monitor is enhanced by decreasing the width of a front casing which surrounds and supports an edge portion of the LCD panel. In addition, as a chassis that supports the LCD panel is fixed at a front casing based on a snap structure, screws are not required. The working time is decreased allowing for a significant decrease in manufacturing cost. Additional advantages, objects and features of the invention will become more apparent from the description that follows.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
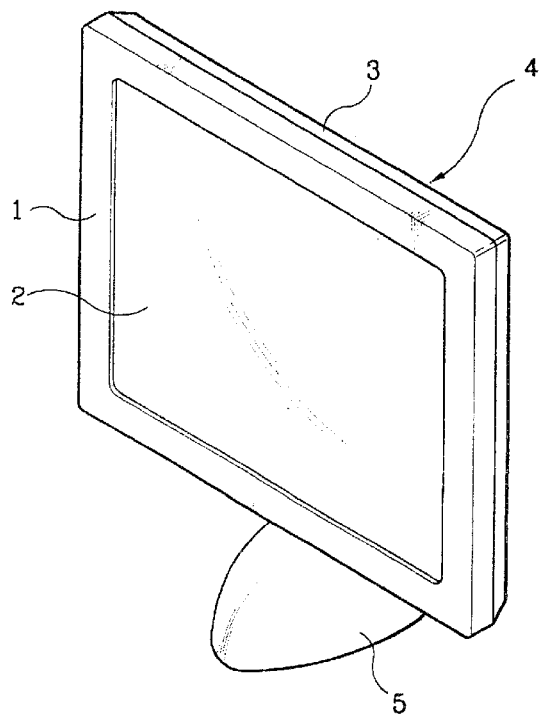
FIG. 1 is a schematic view illustrating an LCD monitor.

Turning now to the drawings, as shown in FIG. 1, the liquid crystal display (LCD) monitor 4 includes a front casing 1, a liquid crystal flat panel display 2 surrounded by the front casing 1, a rear casing 3 engaged to the front casing 1, and a stand 5 engaged to a bent hinge portion (not shown) of the rear casing 3.

Figure 2:
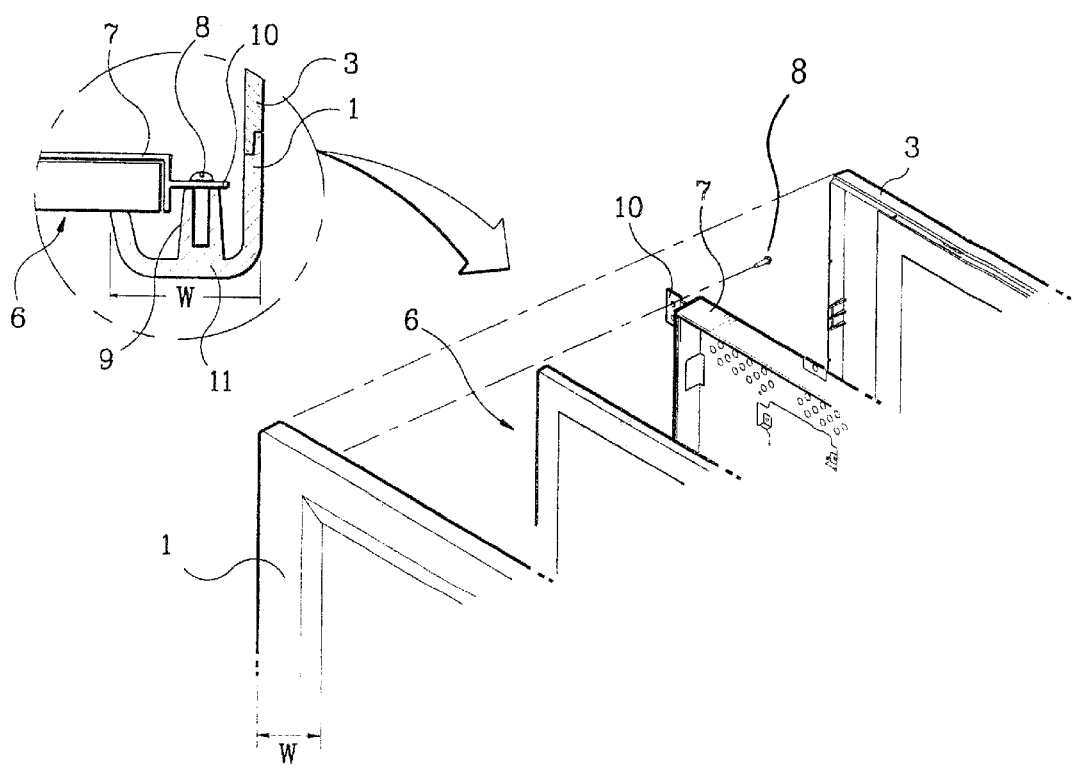
FIG. 2 is a detail view illustrating a chassis fixing portion of an LCD monitor.

Referring to FIG. 2, the LCD panel 6 is fixed to a chassis 7 by a fastening unit. The fastening unit has a screw or bolt mount 10 engaged to a boss 9 in a state that a bolt or screw 8 extended at one side of the chassis 7 is formed closely at the boss 9 formed in the interior of the front casing 1. Therefore, the LCD panel 6 is fixed at the front casing 1, and the rear casing 3 is detachably engaged to the front casing 1 by the fastening unit.

In order to fix the chassis 7 to the front casing 1, the screw or bolt 8 is extended on the chassis 7, and in order to fix the screw or bolt 8, the boss 9 is formed at the front casing 1. Therefore, the width W of the edge portion 11 of the front casing 1 which surrounds the edge portion of the LCD panel 6 is increased, and as the screw or bolt mount 10 is used, the number of parts is increased, so that the fabrication cost is increased.

In addition, in order to fix the chassis 7 to the front casing 1 for engaging the LCD panel 6 thereto, the working processes are increased, so that the productivity is decreased. The width W of the edge portion 11 of the front casing 1 is increased, the external appearance of the LCD monitor 4 is diminished.

Figure 3:
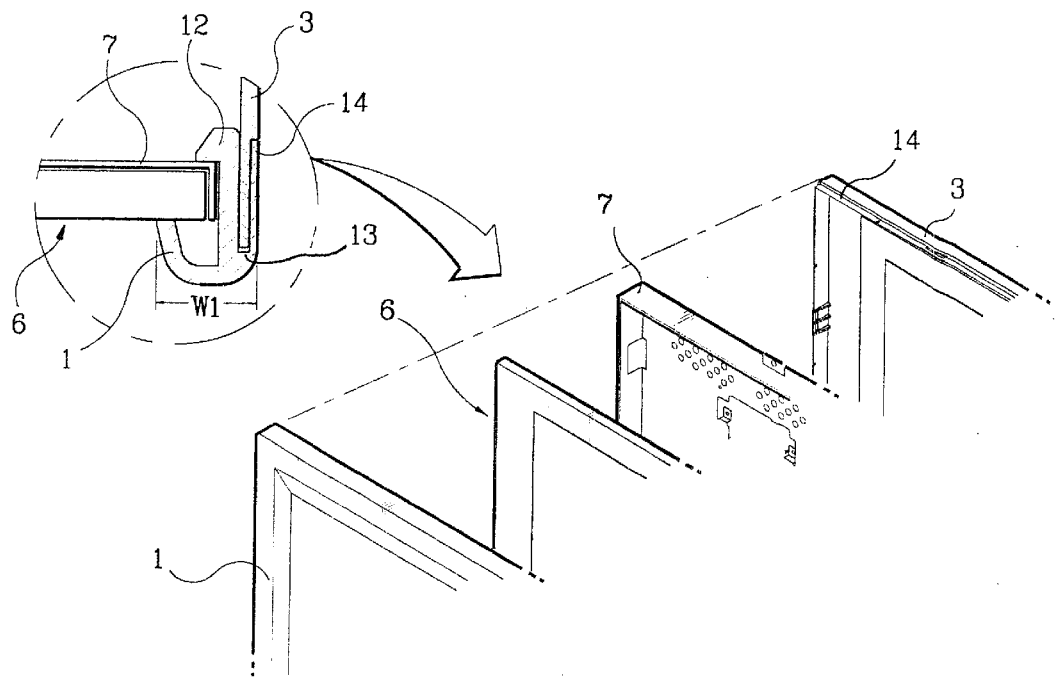
FIG. 3 is a cross-sectional view of a major part of a chassis fixing apparatus for an LCD monitor according to the present invention.
Figure 4:
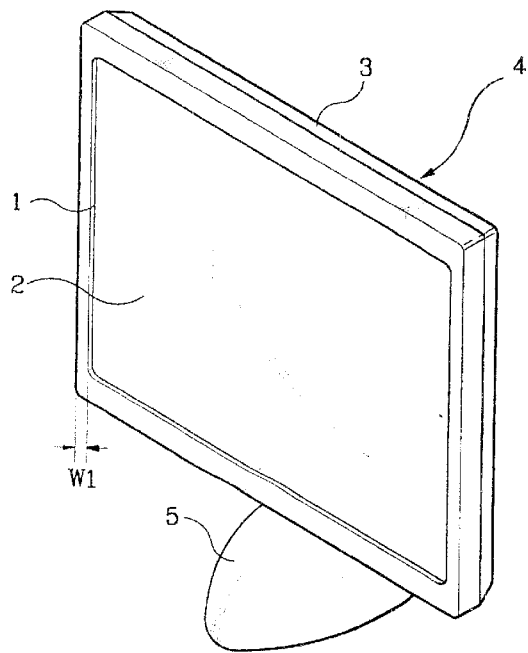
FIG. 4 is a front view illustrating a chassis fixing apparatus for an LCD monitor according to the present invention.

As shown in FIGS. 3 and 4, the LCD monitor 4 according to the present invention includes a front casing 1 with various function buttons, a display liquid crystal panel 6 having an edge portion surrounded by the front casing 1, a chassis 7 for supporting the liquid crystal panel 6, and a rear casing 3 detachably engaged to the front casing 1 for protecting inner parts.

A hook portion 12 is integrally formed from the front casing 1 for fixedly supporting the chassis 7. Therefore, a lower end of the hook portion 12 is press-inserted into the chassis 7 when engaging the rear casing 3 to the front casing 1 for thereby preventing the chassis 7 from escaping from the hook portion 12.

Figure 5:
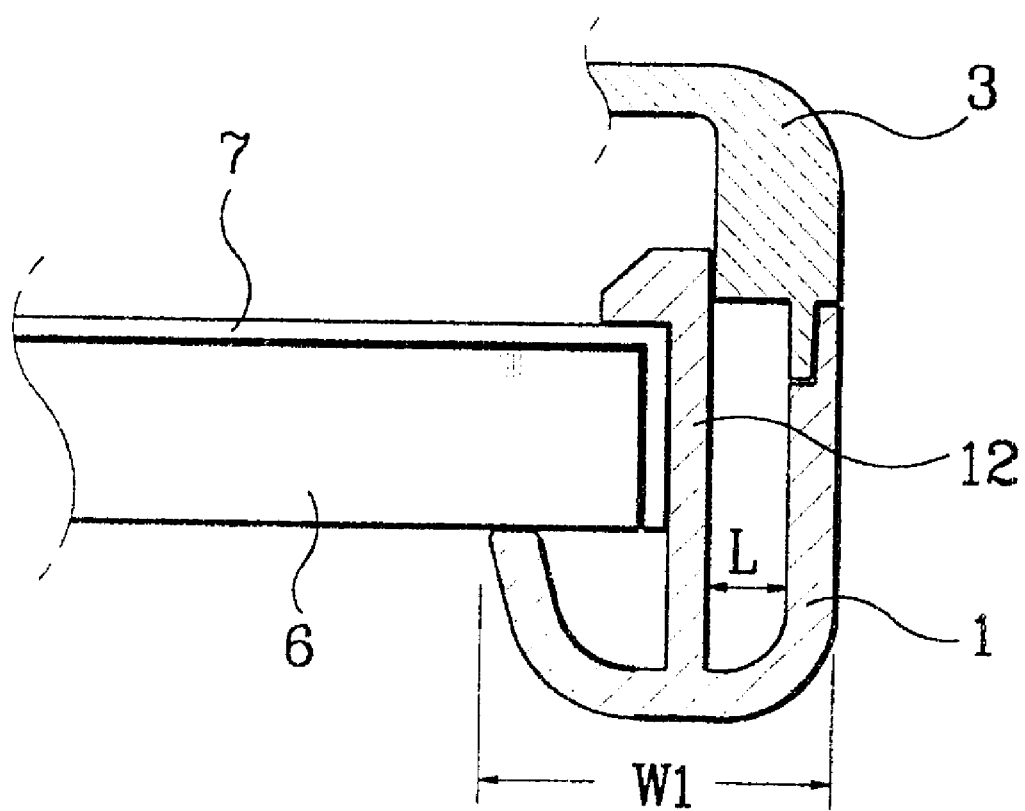
FIG. 5 is a view illustrating another example of a chassis fixing apparatus for an LCD monitor according to the present invention.

As shown in FIG. 5, the hook portion 12 is formed at a certain distance L from an inner surface of the front casing 1 for thereby enhancing an engaging force of the chassis 7 by increasing a pressing force which presses the hook portion 12 when engaging the rear casing 3 to the front casing 1.

The assembling process of the chassis fixing apparatus for an LCD monitor 4 according to the present invention will be explained with respect to the accompanying drawings.

As shown in FIG. 3, the liquid crystal panel 6 is stably engaged to the chassis 7 using a certain fastening unit. The chassis 7 which supports the liquid crystal panel 6 is mounted on the hook portion 12 integrally formed in the interior of the front casing 1. Thereafter, the rear casing 3 is engaged with respect to the front casing 1 using a certain fastening member.

At this time, when a protrusion 14 of the rear casing 3 is engaged into an engaging groove 13 between the front casing 1 and the hook portion 12, a lower portion of the hook portion 12 is pressed to the chassis 7 by an elastic force of the hook portion 12. Therefore, a lower portion of the hook portion 12 is pressed to the chassis 7 for thereby stably supporting the chassis 7, so that the chassis 7 is fixedly supported by the front casing 1.

The chassis 7 engaged with the liquid crystal panel 6 is engaged to the front casing 1 based on a snap structure. Therefore, it is not needed to additionally form a structure on an inner surface of the front casing 1 for fixing screws, so that the width W1 of the edge portion 11 which surrounds the edge portion of the liquid crystal panel 6 is decreased.

As described above, in the chassis fixing apparatus for an LCD monitor 4 according to the present invention, the monitor 4 has a good external appearance by decreasing the width of the edge portion of the front casing which surrounds and supports the edge portion of the liquid crystal panel.

In the present invention, as the chassis which fixedly supports the liquid crystal panel is fixed to the front casing based on a snap structure, screws are not needed. In addition, assembly time is decreased, so that it is possible to significantly enhance the productivity.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A chassis apparatus for a liquid crystal display monitor, comprising:
 a front casing surrounding and supporting an edge of a liquid crystal panel, the liquid crystal panel displaying variable video;
 a chassis engaging the liquid crystal panel;
 a hook integrally formed in an interior of said front casing, said hook receiving and supporting said chassis; and
 a rear casing detachably engaging with said front casing, said hook being pressed to said chassis preventing said chassis from escaping from said hook.

2. The apparatus of claim 1, said hook being formed at a certain distance from an inner surface of said front casing and enhancing an engaging force of said chassis based on an increased force pressing said hook when engaging said rear casing to said front casing.

3. The apparatus of claim 1, said rear casing comprising:
 a first side perpendicular with a viewing surface of the liquid crystal panel; and
 a first protrusion projecting from said first side, said first protrusion being parallel with said first side of said rear casing.

4. The apparatus of claim 1, said front casing having a first flat portion forming a groove between said hook and said first flat portion, the groove accommodating said first protrusion engaging said rear casing with said front casing.

5. The apparatus of claim 1, with said front casing further comprising a curved portion surrounding and supporting the edge of a viewing surface of the liquid crystal panel.

6. The apparatus of claim 1, with said hook comprising:
 a second flat portion parallel with a side surface of the liquid crystal panel and in contact with a side surface of said chassis; and
 a detent portion in contact with a back surface of said chassis.

7. The apparatus of claim 1, said hook being formed along a length of a side surface of said front casing.

8. The apparatus of claim 2, with said hook comprising:
 a second flat portion parallel with a side surface of the liquid crystal panel and in contact with a side surface of said chassis; and
 a detent portion in contact with a back surface of said chassis.

9. The apparatus of claim 8, an upper portion of an outer side surface of said detent portion being in contact with an inner side surface of said rear casing.

10. The apparatus of claim 9, said rear casing having a first protrusion, said front casing having a first flat portion forming an outer side wall of said front casing, said first flat portion having a step shaped second protrusion on an upper portion of said first flat portion, said second protrusion of said front casing engaging said first protrusion of said rear casing.

11. A liquid crystal display monitor, comprising:

a liquid crystal panel displaying variable video;

a front casing having a curved portion surrounding and supporting an edge of said liquid crystal panel;

a chassis engaging the liquid crystal panel;

a hook integrally formed in an interior of said front casing, said hook receiving and supporting said chassis;

a first flat portion integrally formed from said front casing forming a groove between said hook and said first flat portion;

a rear casing detachably engaging with said front casing, said hook being pressed to said chassis preventing said chassis from escaping from said hook, a first side formed on said rear casing and being perpendicular with a viewing surface of said liquid crystal panel, a first protrusion projecting from said first side, said first protrusion being parallel with said first side of said rear casing, the groove of said front casing accommodating said first protrusion engaging said rear casing with said front casing; and a stand being hinged to and supporting said front and rear casings.

12. The liquid crystal display monitor of claim 11, with said hook comprising:

a second flat portion parallel with a side surface of said liquid crystal display and in contact with a side surface of said chassis; and a detent portion in contact with a back surface of said chassis.

13. The liquid crystal display monitor of claim 12, said hook being formed at a certain distance from an inner surface of said front casing and enhancing an engaging force of said chassis based on an increased force pressing said hook when engaging said rear casing to said front casing.

14. The liquid crystal display monitor of claim 13, an upper portion of a side surface of said detent portion being in contact with an inner side surface of said rear casing.

15. The liquid crystal display monitor of claim 14, further comprising:

said rear casing having a first protrusion; and said front casing having a first flat portion forming an outer side wall of said front casing, said first flat portion having a step shaped second protrusion on an upper portion of said first flat portion, said second protrusion of said front casing engaging said first protrusion of said rear casing.

16. A method, comprising the steps of:

engaging a liquid crystal panel with a chassis, said liquid crystal panel displaying variable video;

surrounding and supporting a front edge of said liquid crystal panel with a curved portion of a front casing;

receiving and supporting said chassis with a hook integrally formed in an interior of said front casing;

forming a first flat portion integral with said front casing, a groove forming between said hook and said first flat portion;

engaging a rear casing with said front casing, said hook being pressed to said chassis preventing said chassis from escaping from said hook, a first side formed on said rear casing and being perpendicular with a viewing surface of said liquid crystal panel, a first protrusion projecting from said first side, said first protrusion being parallel with said first side of said rear casing, the groove of said front casing accommodating said first protrusion engaging said rear casing with said front casing; and pivotally mounting a stand to said front and rear casings, said stand supporting said front and rear casings.

17. The method of claim 16, said receiving and supporting of said chassis with said hook further comprising the steps of:

contacting a second flat portion of said hook with a side surface of said chassis, said second flat portion being parallel with a side surface of said liquid crystal display; and contacting a detent portion with a back surface of said chassis.

18. The method of claim 17, said hook being formed at a certain distance from an inner surface of said front casing and enhancing an engaging force of said chassis based on an increased force pressing said hook when engaging said rear casing to said front casing.

19. The method of claim 18, said receiving and supporting of said chassis with said hook further comprising the step of contacting an upper portion of a side surface of said detent portion with an inner side surface of said rear casing.

20. The method of claim 19, said rear casing having a first protrusion, said front casing having a first flat portion forming an outer side wall of said front casing, said first flat portion having a step shaped second protrusion on an upper portion of said first flat portion, said second protrusion of said front casing engaging said first protrusion of said rear casing.

* * * * *